United States Patent Office 3,707,562
Patented Dec. 26, 1972

3,707,562
10-AMINOALKYLENE-5H-DIBENZO[a,d] CYCLOHEPTENES
Walter Schindler and Hans Blattner, Riehen, near Basel, Switzerland, assignors to Ciba-Geigy Corporation, Ardsley, N.Y.
No Drawing. Continuation-in-part of application Ser. No. 571,193, Aug. 9, 1966. This application June 9, 1969, Ser. No. 831,719
Claims priority, application Switzerland, Aug. 12, 1965, 11,113/65; Aug. 19, 1965, 11,686/65
Int. Cl. C07c 87/28
U.S. Cl. 260—570.8 TC    10 Claims

ABSTRACT OF THE DISCLOSURE

The compounds are of the class of substituted 10-amino-(lower)alkyl - 5H - dibenzo[a,d]cycloheptenes and the pharmaceutically acceptable acid addition salts thereof and have a depressant effect on the central nervous system; pharmaceutical compositions comprising these compounds and a pharmaceutical carrier and the method of producing a depressant effect on the central nervous system are provided; an illustrative embodiment is 8-methyl-10-dimethylaminomethyl - 5H - dibenzo[a,d]cycloheptene.

CROSS REFERENCE

This is a continuation-in-part of copending application Ser. No. 571,193, filed Aug. 9, 1966 and now abandoned.

DETAILED DISCLOSURE

This invention concerns substituted aminoalkyldibenzocycloheptenes and the pharmaceutically acceptable acid addition salts thereof, pharmaceutical compositions containing these compounds and the use thereof.

More particularly, the invention pertains to compounds of the formula

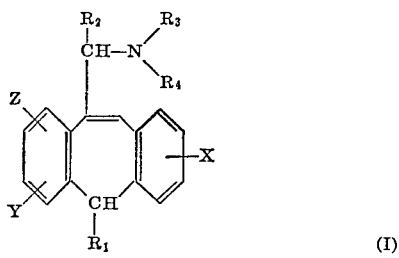

(I)

wherein

X and Y are hydrogen, chloro, bromo, lower alkyl or lower alkoxy,
Z is hydrogen, chloro, bromo, lower alkyl or lower alkoxy or, when both X and Y are hydrogen, Z is also lower alkylthio,
$R_1$ is hydrogen or lower alkyl,
$R_2$ is hydrogen or methyl,
$R_3$ and $R_4$ is hydrogen or lower alkyl, or
$NR_3(R_4)$ is a saturated heterocyclic ring having 5 to 7 ring members with, optionally, a lower alkylimino, hydroxyalkylimino or alkanoyloxyalkylimino group as ring member, if at least one of the substituents X, Y, Z and $R_1$ is different from hydrogen, and wherein $NR_3(R_4)$ is amino, or a saturated heterocyclic ring having 5 or 7 ring members with, optionally, a lower alkylimino, hydroxyalkylimino or alkanoyloxyalkylimino group as ring member, or a saturated heterocyclic ring having 6 ring members, in which an alkanoyloxyalkylimino group is one of the ring members, if the substituents X, Y, Z and $R_1$ are hydrogen;

and the pharmaceutically acceptable acid addition salts thereof.

A preferred subclass are compounds of Formula I, wherein

X is hydrogen,
Y is hydrogen,
Z is hydrogen, methyl, methoxy, methylthio or chloro,
$R_1$ is hydrogen or methyl,
$R_2$ is hydrogen or methyl, and
each of $R_3$ and $R_4$ is methyl,
whereby at least one of the substituents X, Y, Z and $R_1$ is different from hydrogen, and the pharmaceutically acceptable acid addition salts thereof.

Preferred members are the following compounds of Formula I:

8-methyl-10-dimethylaminomethyl-5H-dibenzo[a,d] cycloheptene,
8-methyl-10-(1-dimethylaminoethyl)-5H-dibenzo[a,d] cycloheptene,
8-methoxy-10-dimethylaminomethyl-5H-dibenzo[a,d] cycloheptene,
8-chloro-10-dimethylaminomethyl-5H-dibenzo[a,d] cycloheptene,
5-methyl-10-dimethylaminomethyl-5H-dibenzo[a,d] cycloheptene,
8-methylthio-10-dimethylaminomethyl-5H-dibenzo[a,d] cycloheptene,
5,8-dimethyl-10-dimethylaminomethyl-5H-dibenzo[a,d] cycloheptene, and the pharmaceutically acceptable acid addition salts thereof.

Embraced by the present invention are also pharmaceutical compositions comprising a compound of Formula I and/or a pharmaceutically acceptable acid addition salt thereof, and a pharmaceutically acceptable carrier therefor.

Furthermore, embraced is the method of producing a depressant effect on the central nervous system of a mammal comprising administering to said mammal an effective amount of a compound of Formula I and/or a pharmaceutically acceptable acid addition salt thereof.

The compounds of the invention have valuable pharmacological, in particular central nervous system depressant, properties on oral, rectal or parenteral administration. They have, for example, sedative, anticonvulsive, anesthesia-potentiating, histamine antagonistic and bronchospasmolytic properties. These pharmacological properties, in combination with a favourable low toxicity, characterise the compounds as suitable for the treatment of states of anxiety, tension and agitation which are due, e.g. to neuroses and depression.

The above-mentioned pharmacological properties of the compounds of the invention are determined in experimental animals by various standard test methods [cp. R. Domenjoz and W. Theobald, Ach. Int. Pharmacodyn. 120, 450 (1959); W. Theobald et al. Arch. Int. Pharmacodyn. 148, 560 (1964); W. Theobald et al. Arzneimittelforschung, 17, 561 (1967)].

Thus, merely by illustration, is demonstrated that 8-methyl - 10-dimethylaminomethyl-5H-dibenzo[a,d]cycloheptene hydrochloride on intraperitoneal administration to mice in amounts of about 3 mg./kg. decreases the spontaneous orientation motility to a considerable extent.

The same compound, administered in amounts of about 5 to 20 mg./kg. subcutaneously to mice anesthetised intraperitoneally with 40 mg./kg. of the short-acting anesthetic N,N-diethyl-2-methoxy - 4 - allyl-phenoxyacetic acid amide, potentiates, i.e. prolongs the effect of the anesthetic to a very significant extent.

The same compound, administered in amounts of about 9.3 mg./kg. subcutaneously to mice, prevents about 50% of the animals, hanging on to a wire with their front paws, from pulling up and gripping the wire with their hind paws (test de la traction).

Similar activity is found with other compounds of the invention.

The toxicity of the compounds of the invention is of favorable low order as demonstrated in mice on intravenous administration.

In the compounds of Formula I, X, Y and Z are preferably in the 2- or 3- or in the 7- and/or 8-position, respectively. As lower alkyl they can be, e.g. the methyl or ethyl group. Z, as lower alkylthio group, in particular is the methylthio group, preferably, in the 7- or 8-position. Also, $R_1$, $R_3$ and $R_4$, as lower alkyl are e.g. the methyl, ethyl, propyl, isopropyl, butyl, isobutyl, sec. butyl and the tert. butyl group. $NR_3(R_4)$, as heterocyclic ring is, e.g. the 1-pyrrolidinyl, piperidino, hexahydro - 1H-azepin - 1 - yl, 1 - piperazinyl, 4 - methyl - 1 - piperazinyl, 4-(2 - hydroxyethyl) - 1 - piperazinyl, 4 - (2 - acetoxyethyl) - 1 - piperazinyl, 4 - (2 - pivaloyloxyethyl) - 1-piperazinyl, hexahydro - 1H - 1,4 - diazepin - 1 - yl, 4-(2-hydroxyethyl) - hexahydro - 1H - 1,4 - diazepin - 1 - yl or the 4-methyl-hexahydro-1H-1,4-diazepin-1-yl group.

The compounds of Formula I are prepared by reacting a reactive ester of a hydroxyl compound of the Formula II

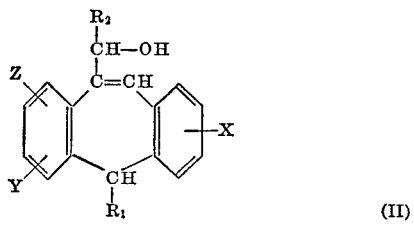

(II)

wherein

X, Y, Z, $R_1$ and $R_2$ have the meanings given in Formula I, with a compound of the Formula III

(III)

wherein $R_3$ and $R_4$ or $NR_3(R_4)$ have the meanings given in Formula I, or with an N-acyl derivative of piperazine or hexahydro-1H-1,4-diazepine or with a metal compound of an N-acyl derivative of a lower alkylamine, if necessary, subjecting the reaction product to hydrolysis to split off any acyl radical bound to a nitrogen atom in the side chain, if desired, treating a compound of the Formula I containing the imino group as ring member, with a lower alkylene oxide, a reactive monoester of a lower alkane diol or with a reactive ester of a lower alkanoyloxyalkanol, if desired, acylating a compound of the Formula I containing a lower hydroxyalkylimino group as ring member into one containing a lower alkanoyloxyalkylimino group and, if desired, converting a compound of Formula I into a salt with an inorganic or organic acid.

The halides, particularly the bromides, are used in particular as reactive esters of hydroxyl compounds of the Formula II. Other derivatives of this type are sulfonic acid esters such as tosyl or mesyl esters.

Reactions of reactive esters of compounds of the Formula II with amines of Formula III are performed, e.g. in inert solvents whereby an excess of amine can serve as acid binding agent and, optionally, also as sole reaction medium. Suitable inert solvents are, e.g. hydrocarbons such as benzene or toluene, lower alkanols such as methanol or ethanol, lower alkanones such as acetone or methylethyl ketone as well as water. The reaction is more or less exothermic depending on the meaning of $R_1$, $R_2$, $R_3$ and $R_4$; if necessary, it is completed by heating the reaction mixture. The reactive esters of compounds of Formula II can be reacted, e.g. with the dimethylamine, methylethylamine, diethylamine, dipropylamine, dibutylamine, methylamine, ethylamine, propylamine, isopropylamine, sec. butylamine, ammonia, pyrrolidine, piperidine, hexamethyleneimine, 1 - methylpiperazine, piperazine-1-ethanol, 1 - ( 2 acetoxyethyl)-piperazine, 1-(2-pivaloyloxyethyl)-piperazine or 1 - methyl-hexahydro - 1H - 1,4-diazepine.

The reaction of a compound of Formula II with a metal compound of an N-acyl derivative of a lower alkylamine such as the sodium compound of a lower N-formyl, N-alkoxycarbonyl- or an N-phenoxycarbonyl- alkylamine is performed, e.g. in an inert organic solvent under anhydrous conditions. Suitable solvents are, e.g. hydrocarbons such as benzene or toluene. The acyl group in the reaction product obtained, which is bound to a nitrogen atom of the side chain, can then be split off by heating the reaction product with an alkali metal hydroxide such as potassium hydroxide, in an organic solvent. Suitable reaction media are, e.g. solvents containing hydroxyl groups such as ethylene glycol or diethylene glycol, their lower alkyl ethers, or lower alkanols such as ethanol. The lower alkanols are preferably used in a closed vessel. In addition, the hydrolysis can also be performed, e.g. by boiling with alkanolic hydrochloric acid.

Lower hydroxyalkyl or alkanoyloxyalkyl radicals are introduced into the free imino group of compounds of the Formula I wherein $NR_3(R_4)$ forms a heterocyclic radical with an imino group as ring member, by treating such compounds, particularly 1-piperazinyl or hexahydro-1H-1,4-diazepin-1-yl compounds with, e.g. ethylene oxide, propylene oxide, 2-bromoethanol, 2-(p-tolylsulfonyloxyethanol) or 2-(bromoethyl)-acetate. The reaction is preferably performed in a solvent to which—if the reaction proceeds with splitting off of 1 mol equivalent of acid—an acid binding agent is added. Suitable solvents are, e.g. hydrocarbons such as benzene or toluene, lower alkanones such as acetone or methylethyl ketone. Alkali carbonates, such as potassium carbonate are suitable acid binding agents.

The hydroxyl groups of compounds of Formula I wherein $NR_3(R_4)$ form a heterocyclic radical with a lower hydroxyalkylimino group as ring member, particularly of 4 - hydroxyalkyl - 1 - piperazinyl or 4-hydroxyalkylhexahydro - 1,4 - diazepin - 1 - yl compounds, are acylated by heating these e.g. in the anhydride of a lower alkanoic acid such as acetic acid, propionic acid, butyric acid or pivalic acid or by treating them with a corresponding acid halide in a tertiary nitrogen base such as pyridine. In addition, the sodium derivatives of such hydroxyalkyl compounds can also be reacted with corresponding acid halides.

A reactive ester of a hydroxyl compound of Formula II usable as starting material is 10 - chloromethyl-5H-dibenzo[a,d]cycloheptene. This reactive ester can be produced, for example as follows:

5H-dibenzo[a,d]cycloheptene-10(11H) - one described in the literature (compare N. J. Leonard, A. J. Kresge and Michinori Oki, J. Am. Chem. Soc. 77, 5078 [1955]) is used as starting material. This is converted according to Grignard with methyl iodide and magnesium into 10-methyl-10,11-dihydro - 5H - dibenzo[a,d]cycloheptene-10-ol, the intermediate product is dehydrated with hydrochloric acid to form 10-methyl-5H-dibenzo[a,d]cycloheptene which, with selenium dioxide, yields 5H-dibenzo[a,d]cycloheptene - 10 - carboxaldehyde. The reduction of this aldehyde with sodium borohydride yields 5H-dibenzo[a,d]cycloheptene-10 - methanol which is treated with thionyl chloride.

A corresponding reacting ester of a compound of Formula II, the substituent $R_2$ of which is methyl, is obtained e.g. from the 5H - dibenzo[a,d]cycloheptene-10-carboxaldehyde mentioned above by reacting the latter with magnesium and methyl iodide according to Grignard and converting the α - methyl - 5H-dibenzo[a,d]cycloheptene - 10 - methanol obtained into 10 - (1-chloroethyl) - 5H - dibenzo[a,d]cycloheptene with thionyl chloride. Other reactive esters of hydroxyl compounds of Formula II can be produced analogously to the examples mentioned.

The compounds of the Formula I obtained according to the process of the invention are then converted, if desired, into their addition salts with inorganic and organic acids in the usual way. For example, the acid desired as salt component or a solution thereof is added to a solution of a compound of Formula I in an organic solvent. Preferably, organic solvents are chosen for the reaction in which the salt to be formed is difficultly soluble so that it can be isolated by filtration. Such solvents are, e.g. methanol, methanol/diethyl ether or ethanol/diethyl ether.

For use as medicaments, pharmaceutically acceptable acid addition salts can be used i.e. salts with those acids the anions of which are pharmaceutically acceptable in the usual doses. Also it is of advantage if the salts to be used as medicaments crystallise well and are not or are only slightly hygroscopic. For example, hydrochloric acid, hydrobromic acid, sulfuric acid, phosphoric acid, methane sulfonic acid, ethane sulfonic acid, β-hydroxyethane sulfonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid can be used for salt formation with compounds of Formula I.

As mentioned above, the new active substances are administered orally, rectally and parenterally. The dosage depends on the species, age and health of the individuum, on the mode of administration and the particular condition to be treated. In general, the daily doses of the free bases or of pharmaceutically acceptable salts thereof vary between 10 and 800 mg. for adult patients. Suitable dosage units such as dragées (sugar coated tablets), tablets, suppositories or ampoules, preferably contain 5 to 50 mg. of an active substance according to the invention or a pharmaceutically acceptable salt thereof. Also corresponding amounts of forms not made up into single dosages can be used, such as syrups, aerosols, ointments or powders.

Dosage units for oral administration preferably contain between 1–90% of a compound of Formula I or a pharmaceutically acceptable salt thereof as active substance. They are produced, e.g. by combining the active substance with solid, pulverulent carriers such as lactose, saccharose, sorbitol, mannitol; starches such as potato starch, corn starch, or amylopectin, also laminaria powder or citrus pulp powder; cellulose derivatives or gelatine, optionally with the addition of lubricants such as magnesium or calcium stearate or polyethylene glycols (Carbowaxes) of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Dosage units for rectal administration are, e.g. suppositories which consist of a combination of an active substance or a suitable salt thereof with a neutral fatty foundation, or also gelatine rectal capsules which contain a combination of the active substance or a suitable salt thereof with polyethylene glycols (Carbowaxes) of suitable molecular weight.

Ampoules for parenteral, particularly intramuscular, administration preferably contain a water-soluble salt of an active substance in a concentration of, preferably, 0.5 to 5% in aqueous solution, optionally together with suitable stabilising agents and buffer substances.

The following examples will serve to further typify the nature of the present invention. They should, however, not be construed as a limitation on the scope thereof. The temperatures are given in degrees centigrade.

EXAMPLE 1

(a) 12.0 g. of 10-chloromethyl-5H-dibenzo[a,d]cycloheptene are dissolved in 20 ml. of abs. benzene and the solution is added dropwise within 30 minutes, to a stirred solution of 9.5 g. of pyrrolidine in 45 ml. of abs. benzene. The reaction mixture is stirred for 1 hour at 40°, then refluxed for 1 hour, cooled to 20° and 15 ml. of water are added. The organic phase is separated and extracted with 2 N hydrochloric acid. The hydrochloric acid extract is made phenolphthalein alkaline with concentrated aqueous ammonia and the free base is shaken with diethyl ether. The ethereal solution is washed with water, dried over potassium carbonate and concentrated. The residue, which is recrystallized from pentane, yields 10 - (1 - pyrrolidinylmethyl) - 5H - dibenzo[a,d]cycloheptene which melts at 70–72°. The free base is converted with ethanolic hydrochloric acid into the hydrochloride. Recrystallized from abs. ethanol the latter melts at 270–274°.

The starting material, 10 - chloromethyl - 5H - dibenzo[a,d]cycloheptene, is produced according to the following paragraphs (b) to (f):

(b) A solution of 69.5 of 5H - dibenzo[a,d]cycloheptene-10(11H)-one (M.P. 76°) is added dropwise within 3 hours while keeping a reaction temperature of −15 to −10° to a well-stirred Grignard solution which is prepared from 24.5 g. of magnesium, 142 g. of methyl iodide and 300 ml. of abs. diethyl ether. While continuing the stirring, the temperature is raised within 2 hours to 0°, then within a further hour to 20° and finally to 40°, which latter temperature is maintained for 20 hours. The reaction mixture is then cooled to 0° and stirred into a solution of 300 g. of ammonium chloride in 500 ml. of ice water. The organic phase is removed and the aqueous phase is extracted with benzene. The combined organic solutions are washed with water, dried over potassium carbonate and concentrated in vacuo. Recrystallisation of the residue from cyclohexane yields 10 - methyl - 10,11-dihydro - 5H - dibenzo[a,d]cycloheptene - 10 - ol which melts at 107–108°.

(c) 50.0 g. of the hydroxyl compound obtained according to Example 1(b) are refluxed for 2 hours in 300 ml. of 2 N hydrochloric acid. The mixture is then cooled to 20° and extracted with petroleum ether, the organic phase is washed with water, dried over potassium carbonate and concentrated. The residue, crude 10-methyl-5H-dibenzo[a,d]cycloheptene, melts at 52–53°.

(d) 56.0 g. of the crude product melting at 52–53° produced according to Example 1(c) and 34.0 g. of selenium dioxide are heated, while stirring, for 15 minutes at 133–137° and then for 15 minutes at 153–157° (reaction temperature). The reaction mixture is then cooled to 80° and extracted with boiling benzene. The benzene solution is filtered and cooled, whereupon 5H-dibenzo[a,d]cycloheptene-10-carboxaldehyde crystallises out. It melts at 133–136°.

(e) 22.0 g. of the aldehyde obtained according to Example 1(d) are dissolved in 150 ml. of methanol. A solution of 7.6 g. of sodium borohydride in 50 ml. of ice cold methanol is added dropwise to this solution while stirring and maintaining a temperature of 20–30°. Stirring is continued for 3 hours at 40° whereupon the reaction mixture is refluxed for another 3 hours. The solution is cooled to 20° and concentrated in vacuo. Water is added to the residue which is then extracted with diethyl ether. The ethereal solution is washed with water, dried over potassium carbonate and concentrated in vacuo. The residue is crystallised from cyclohexanone, whereupon the 5H - dibenzo[a,d]cycloheptene - 10 - methanol obtained melts at 92 to 94°.

(f) 22.2 g. of the hydroxymethyl compound obtained according to Example 1(e) are dissolved by stirring into 100 ml. of absolute benzene and, at 20 to 30°, a solution of 14.9 g. of thionyl chloride in 15 ml. of absolute benzene is added dropwise. On completion of the dropwise addition, the reaction mixture is stirred for 45 minutes at 40° and then refluxed for one hour. The clear solution is cooled, washed well with water, dried over sodium sulfate and concentrated. Recrystallisation of the residue from petroleum ether yields 10-chloro-methyl-5H-dibenzo [a,d]cycloheptene, M.P. 70–72°.

EXAMPLE 2

(a) The following compound is produced analogously to Example 1(a) from 10 - (1 - chloroethyl) - 5H-dibenzo[a,d]cycloheptene with pyrrolidine:

10 - [1 - (1 - pyrrolidinyl) - ethyl] - 5H - dibenzo[a,d] cycloheptene, M.P. 106–107° from petroleum ether, hydrochloride, M.P. 237–240° from absolute ethanol.

The starting material, 10 - (1 - chloroethyl) - 5H-dibenzo[a,d]cycloheptene, is produced according to the following paragraphs (b) to (c):

(b) A solution of 66 g. of 5H-dibenzo[a,d]cycloheptene-10-carboxaldehyde (M.P. 133–136°) in 200 ml. of absolute benzene is added dropwise within 2 hours to a Grignard solution prepared from 22.0 g. of magnesium, 128 g. of methyl iodide and 200 ml. of absolute diethyl ether, the addition being made at a temperature of −15 to −10° while stirring. On completion of the dropwise addition, the temperature of the solution is raised to 20° within 2 hours whereupon it is stirred for another 18 hours at a reaction temperature of 40°. After cooling, the reaction mixture is stirred into a solution of 200 g. of ammonium chloride in 500 ml. of ice water. The organic phase is removed and the aqueous phase is again extracted with benzene. The combined organic solutions are washed with water, dried over potassium carbonate and concentrated in vacuo. The residue is crystallised from benzene whereupon the α-methyl-5H-dibenzo[a,d]cycloheptene-10-methanol obtained melts at 86–88°.

(c) 66.0 g. of the hydroxyl compound produced according to Example 3(b) are dissolved by stirring into 250 ml. of absolute benzene and a solution of 37.5 g. of pure thionyl chloride in 37.5 ml. of absolute benzene is added dropwise at 20 to 30°. On completion of the dropwise addition, the reaction mixture is stirred for 1 hour at 40° and then refluxed for another hour. It is then cooled, the benzene solution is washed well with water, dried over sodium sulfate and the solvent is distilled off in vacuo. The residue is recrystallised from petroleum ether. The 10 - (1 - chloroethyl) - 5H - dibenzo[a,d] cycloheptene obtained melts at 75–76°.

EXAMPLE 3

(a) The following compounds are produced analogously to Example 1(a) from 8-chloro-10-chloromethyl-5H-dibenzo[a,d]cycloheptene:

(a$^1$) with dimethylamine, 8-chloro-10-dimethylaminomethyl - 5H - dibenzo[a,d]cycloheptene, M.P. 125–127° from absolute ethanol;

(a$^2$) with methylamine, 8 - chloro - 10 - methylaminomethyl - 5H - dibenzo[a,d]cycloheptene, M.P. 42–45° from pentane, and (a$^3$) with pyrrolidine, 8 - chloro - 10 - (1 - pyrrolidinylmethyl) - 5H - dibenzo[a,d]cycloheptene, M.P. 117–119° from cyclohexane.

The starting material, 8-chloro-10-chloromethyl-5H-dibenzo[a,d]cycloheptene, is obtained according to the following paragraphs (b) to (c$^5$):

(b) First 8 - chloro - 5H - dibenzo[a,d]cycloheptene-10(11H)-one, M.P. 104–106°, is produced analogously to 5H - dibenzo[a,d]cycloheptene - 10(11H) - one [compare N. J. Leonard, A. J. Kresge and Michinori Oki, J. Am. Chem. Soc. 77, 5078 (1955)] by way of the following intermediate products:

(b$^1$) α-(p-chlorophenyl)-o-toluic acid, M.P. 128–129°, (b$^2$) α-(p-chlorophenyl)-o-toluic acid ethyl ester, B.P. 140–145°/0.01 torr, (b$^3$) o-(p-chlorobenzyl)-benzyl alcohol, B.P. 150–160°/0.01 torr, (b$^4$) α-bromo-o-(p-chlorobenzyl)-toluene, M.P. 58–59°, (b$^5$) α-(p-chlorophenyl)-o-tolyl acetonitrile, B.P. 140–145°/0.01 torr, and (b$^6$) α-(p-chlorophenyl)-o-tolyl acetic acid, M.P. 139–141°.

The further intermediate products are obtained analogously to Example 1(b) to (f), when starting from 8-chloro-5H-dibenzo[a,d]cycloheptene-10(11H)-one:

(c$^1$) 8-chloro-10-methyl-10,11-dihydro-5H-dibenzo[a,d] cycloheptene-10-ol (crude product);

(c$^2$) 8-chloro-10-methyl-5H-dibenzo[a,d]cycloheptene, M.P. 60–62°, from pentane;

(c$^3$) 8-chloro-5H-dibenzo[a,d]cycloheptene-10-carboxaldehyde, M.P. 118–119° from cyclohexane;

(c$^4$) 8-chloro-5H-dibenzo[a,d]cycloheptene-10-methanol, M.P. 97–98° from cyclohexane, and (c$^5$) 8-chloro-10-chloromethyl-5H-dibenzo[a,d]cycloheptene, M.P. 105–106° from benzene.

EXAMPLE 4

(a) The following compounds are produced analogously to Example 1(a) from 5-methyl-10-chloromethyl-5H-dibenzo[a,d]cycloheptene:

(a$^1$) with dimethylamine, 5 - methyl-10-dimethylaminomethyl-5H-dibenzo[a,d]cycloheptene, B.P. 142–144°/0.02 torr, hydrochloride M.P. 250–251° from abs. ethanol, and (a$^2$) with pyrrolidine, 5-methyl-10-(1-pyrrolidinylmethyl)-5H-dibenzo[a,d]cycloheptene, B.P. 160–162°/0.015 torr, hydrochloride M.P. 242–245° from absolute ethanol.

The starting material used in Example 4(a), 5-methyl-10 - chloromethyl - 5H-dibenzo[a,d]cycloheptene, is obtained analogously to Example 1 (b) to (f) by way of the following intermediate products:

(b) 5-methyl - 5H - dibenzo[a,d]cycloheptene-10(11H)-one, M.P. 97–99° from cyclohexane, (c) 5,10 - dimethyl - 10,11-dihydro-5H-dibenzo[a,d]cycloheptene-10-ol (crude product), (d) 5,10 - dimethyl - 5H-dibenzo[a,d]cycloheptene, M.P. 52–55°, from pentane, (e) 5 - methyl - 5H-dibenzo[a,d]cycloheptene-10-carboxaldehyde, B.P. 160°/0.015 torr, and (f) 5 - methyl-5H-dibenzo[a,d]cycloheptene-10-methanol, M.P. 89–91° from benzene.

EXAMPLE 5

The following end products are obtained analogously to Example 1(a) from:

(a) 8 - methyl - 10-chloromethyl-5H-dibenzo[a,d]cycloheptene:

(a$^1$) with methylamine, the 8 - methyl-10-methylaminomethyl-5H-dibenzo[a,d]cycloheptene, M.P. 69–70°; hydrochloride, M.P. 279° (decomposition);

(a$^2$) with dimethylamine, the 8-methyl-10-dimethylaminomethyl - 5H-dibenzo[a,d]cycloheptene, hydrochloride M.P. 232–233°.

The starting material, 8 - methyl-10-chloromethyl-5H-dibenzo[a,d]cycloheptene (crude product) is obtained analogously to Example 3(b) to (c$^4$) by way of the following intermediate products:

(b$^1$) α-(p-tolyl)-o-toluic acid ethyl ester, B.P. 125–130°/0.05 torr;

(b²) o - (p-methyl-benzyl)-benzylalcohol, M.P. 50–51° from petroleum ether;

(b³) α-bromo-o-(p-methyl-benzyl)-toluene, M.P. 62–63° from pentane;

(b⁴) α - (p-tolyl)-o-tolyl-acetonitrile, M.P. 40–41° from pentane;

(b⁵) α-(p-tolyl)-o-tolyacetic acid, M.P. 116–120° from 80% ethanol;

(b⁶) 8 - methyl - 5H-dibenzo[a,d]cycloheptene-10(11H)-one, M.P. 65° from pentane;

(c¹) 8,10-dimethyl-10,11-dihydro-5H-dibenzo[a,d]cycloheptene-10-ol (crude product);

(c²) 8,10 - dimethyl-5H-dibenzo[a,d]cycloheptene, M.P. 64–65° from pentane;

(c³) 8 - methyl-5H-dibenzo[a,d]cycloheptene-10-carboxaldehyde, M.P. 99–100° from ethanol, and (c⁴) 4 - methyl - 5H-dibenzo[a,d]cycloheptene-10-methanol, M.P. 91–92° from benzene.

EXAMPLE 6

The following end products are obtained analogously to Example 1 from 8-methoxy-10-chloromethyl-5H-dibenzo[a,d]cycloheptene:

(a¹) with 1-methyl-piperazine, the 8-methoxy-10-(4-methyl - 1 - piperazinylmethyl)-5H)-dibenzo[a,d]cycloheptene, dihydrochloride, M.P. 256–260° (decomposition);

(a²) with piperazine-1-ethanol, the 8-methoxy-4-(5H-dibenzo[a,d]cycloheptene - 10 - ylmethyl)-piperazine-1-ethanol, dihydrochloride, M.P. 222–226°, and (a³) with dimethylamine, the 8 - methoxy - 10-dimethylaminoethyl - 5H-dibenzo[a,d]cycloheptene, hydrochloride, M.P. 241°.

The starting material, 8-methoxy-10-chloromethyl-5H-dibenz[a,d]cycloheptene (crude product) is obtained analogously to Example 3(b) to (c⁴) by way of the following intermediate products:

(b¹) α - (p-methoxyphenyl)-o-toluic acid ethyl ester, B.P. 160–165°/0.05 torr;

(b²) o - (p-methoxybenzyl)-benzylalcohol, M.P. 37–40° from pentane;

(b³) α-bromo-o-(p-methoxybenzyl)-toluene, M.P. 39–41° from pentane;

(b⁴) α-(p-methoxyphenyl)-o-tolyl acetonitrile, M.P. 68–71° from pentane;

(b⁵) α-(p-methoxyphenyl)-o-tolyl acetic acid, M.P. 70–73° from cyclohexane;

(b⁶) 8 - methoxy-5H-dibenzo[a,d]cycloheptene-10(11H)-one, M.P. 84–85° from benzene;

(c¹) 8 - methoxy - 10 - methyl-10,11-dihydro-5H-dibenzo[a,d]cycloheptene-10-ol, M.P. 113–115° from diethylether;

(c²) 8-methoxy-10-methyl-5H-dibenzo[a,d]cycloheptene, M.P. 83–84° from benzene;

(c³) 8 - methoxy - 5H-dibenzo[a,d]cycloheptene-10-carboxaldehyde, B.P. 170–174°/0.05 torr, and (c⁴) 8 - methoxy - 5H - dibenzo[a,d]cycloheptene-10-methanol, B.P. 180–185°/0.05 torr.

EXAMPLE 7

8-methylthio - 10 - dimethylaminomethyl-5H-dibenzo[a,d]cycloheptane is obtained analogously to Example 1(a) by reacting 8-methylthio-10-chloromethyl-5H-dibenzo[a,d]cycloheptene with dimethylamine; hydrochloride M.P. 242–245°.

8-methylthio - 10 - chloromethyl-5H-dibenzo[a,d]cycloheptene (crude product) used as starting material is obtained analogously to Example 3(b) to (c⁴) by way of the following intermediate products:

(b¹) α-(p-methylthio-phenyl)-o-toluic acid ethyl ester, B.P. 189–190°/0.4 torr;

(b²) o-(p-methylthio-benzyl)-benzylalcohol, M.P. 66–68° from cyclohexane;

(b³) α-bromo - o - (p-methylthio-benzyl)-toluene (crude product);

(b⁴) α-(p-methylthio-phenyl)-o-tolyl acetonitrile, M.P. 77–79° from benzene;

(b⁵) α-(p-methylthio-phenyl)-o-tolyl acetic acid, M.P. 132–134° from ethanol;

(b⁶) 8-methylthio-5H-dibenzo[a,d]cycloheptene-10(11H)-one, M.P. 100–102° from ethanol;

(c¹) 8-methylthio-10-methyl-10,11-dihydro-5H-dibenzo[a,d]cycloheptene-10-ol (crude product);

(c²) 8-methylthio-10-methyl-5H-dibenzo[a,d]cycloheptene, M.P. 80–85° from petroleum ether;

(c³) 8-methyl-5H-dibenzo[a,d]cycloheptene-10-carboxaldehyde (crude product), and (c⁴) 8-methylthio-5H-dibenzo[a,d]cycloheptene-10-methanol (crude product).

EXAMPLE 8

(a) The following end products are obtained analogously to Example 1(a) from 7,8-dimethyl-10-chloromethyl-5H-dibenzo[a,d]cycloheptene:

(a¹) with dimethylamine, the 7,8-dimethyl-10-dimethylamino-methyl - 5H - dibenzo[a,d]cycloheptene, hydrochloride M.P. 232–233°; and (a²) with piperidine, the 7,8-dimethyl-10-piperidinomethyl-5H-dibenzo[a,d]cycloheptene, hydrochloride M.P. 210–215°.

The starting material, 7,8-dimethyl-10-chloromethyl-5H-dibenzo[a,d]cycloheptene, M.P. 92–94° (from diethylether pentane), is obtained analogously to Example 3(b) to (c⁴) by way of the following intermediate compounds:

(b¹) α-(3,4-dimethyl-phenyl)-o-toluic acid ethyl ester, B.P. 134–137°/0.05 torr;

(b²) o-(3,4-dimethyl-benzyl)-benzylalcohol, M.P. 71–74° from diethylether;

(b³) α-bromo-o-(3,4-dimethyl-benzyl)-toluene, M.P. 39–40° from pentane;

(b⁴) α-(3,4-dimethyl-phenyl)-o-tolyl acetonitrile (crude product);

(b⁵) α-(3,4-dimethyl-phenyl)-o-tolyl acetic acid, M.P. 102–104° from cyclohexane;

(b⁶) 7,8-dimethyl-10-dimethylaminomethyl-5H-dibenzo[a,d]cycloheptene, M.P. 110–112° from ethanol;

(c¹) 7,8,10-trimethyl-10,11-dihydro-5H-dibenzo[a,d]cycloheptene-10-ol (crude product);

(c²) 7,8,10-trimethyl-5H-dibenzo[a,d]cycloheptene, M.P. 107–108° from benzene;

(c³) 7,8-dimethyl-5H-dibenzo[a,d]cycloheptene-10-carboxaldehyde, M.P. 118–120° from diethyl ether/pentane, and (c⁴) 7,8-dimethyl-5H-dibenzo[a,d]cycloheptene-10-methanol, M.P. 183–184° from benzene.

EXAMPLE 9

The following end products are obtained analogously to Example 1(a) from 5,8-dimethyl-10-chloromethyl-5H-dibenzo[a,d]cycloheptene:

(a¹) with dimethylamine, the 5,8-dimethyl-10-dimethylaminomethyl-5H-dibenzo[a,d]cycloheptene, hydrochloride M.P. 158°, and (a²) with diethylamine, and the 5,8-dimethyl-10-diethylaminomethyl-5H-dibenzo[a,d]cycloheptene, B.P. 178°/0.7 torr.

The starting material, 5,8-dimethyl-10-chloromethyl-5H-dibenzo[a,d]cycloheptene, M.P. 81–84° (from diethylether/pentane), may be obtained by the following intermediate products:

(b¹) α-(p-tolyl)-o-(α-methyl-toluic acid ethyl ester), B.P. 136–139°/0.5 torr;

(b²) o-(α,4-dimethyl-benzyl)-benzylalcohol (crude product);

(b³) α-bromo-o-(α,4-dimethyl-benzyl)-toluene, B.P. 122–130°/0.2 torr;

(b⁴) α-(p-tolyl)-α-methyl-o-tolyl acetonitrile (crude product);
(b⁵) α-(p-tolyl)-α-methyl-o-tolyl acetic acid (crude product);
(b⁶) 5,8-dimethyl-5H-dibenzo[a,d]cycloheptene-10(11H)-one M.P. 99° from diethyl ether.
(c¹) 5,8,10-trimethyl-10,11-dihydro-5H-dibenzo[a,d]cycloheptene-10-ol (crude product);
(c²) 5,8,10-trimethyl-5H-dibenzo[a,d]cycloheptene (crude product);
(c³) 5,8-dimethyl-5H-dibenzo[a,d]cycloheptene-10-carboxaldehyde (crude product), and
(c⁴) 5,8-dimethyl-5H-dibenzo[a,d]cycloheptene-10-methanol, M.P. 88–90° from diethyl ether/pentane.

EXAMPLE 10

The following end products are obtained analogously to Example 1(a) from 8-methyl-10-(1-chloroethyl)-5H-dibenzo[a,d]cycloheptene:

(a¹) with methylamine, the 8-methyl-10-(1-methylaminoethyl)-5H-dibenzo[a,d]cycloheptene, fumarate M.P. 170–172°, and
(a²) with dimethylamine, the 8-methyl-10-(1-dimethylaminoethyl) - 5H - dibenzo[a,d]cycloheptene, fumarate M.P. 189–191°.

The starting material, 8-methyl-10-(1-chloroethyl)-5H-dibenzo[a,d]cycloheptene, M.P. 110–115° from diethylether/pentane, is prepared analogously to Example 2(b) to (c) from 8-methyl-5H-dibenzo[a,d]cycloheptene-10-carboxaldehyde by way of the intermediate product, α-8-dimethyl-5H-dibenzo[a,d]cycloheptene - 10-methanol (M.P. 110–115° from diethyl ether/pentane).

The following examples further illustrate the production of tablets and dragées:

EXAMPLE 11

250 g. of 8 - methyl - 10 - dimethylaminomethyl-5H-dibenzo[a,d] cycloheptene hydrochloride are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance. If desired, the tablets can be grooved for better adaption of the dosage.

EXAMPLE 12

A granulate is produced from 250 g. of 8-methyl-10-dimethylaminomethyl-5H-dibenzo[a,d]cycloheptene hydrochloride, 175.90 g. of lactose and the alcoholic solution of 10 g. of stearic acid. After drying, the granulate is mixed with 56.60 g. of colloidal silicium dioxide, 165 g. of talcum, 20 g. of potato starch and 2.50 g. of magnesium stearate and the mixture is pressed into 10,000 dragée cores. These are then coated with a concentrated syrup made from 502.28 g. of crystallised saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

What is claimed is:
1. A compound of the formula

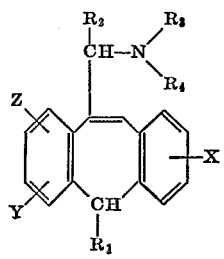

(I)

wherein
X and Y are hydrogen, chloro, bromo, lower alkyl or alkoxy,
Z is hydrogen, chloro, bromo, lower alkyl or lower alkoxy or, when both X and Y are hydrogen, Z is also lower alkylthio,
$R_1$ is hydrogen or lower alkyl,
$R_2$ is hydrogen or methyl,
$R_3$ and $R_4$ is hydrogen or lower alkyl
if at least one of the substituents X, Y, Z and $R_1$ is different from hydrogen, and the pharmaceutically acceptable acid addition salts thereof.

2. A compound according to claim 1, wherein
X is hydrogen,
Y is hydrogen,
Z is hydrogen, methyl, methoxy, methylthio or chloro,
$R_1$ is hydrogen or methyl,
$R_2$ is hydrogen or methyl, and
each of $R_3$ and $R_4$ is methyl,
whereby at least one of the substituents X, Y, Z and $R_1$ is different from hydrogen, and the pharmaceutically acceptable acid addition salts thereof.

3. A compound according to claim 1, which is 8-methyl - 10-dimethylaminomethyl-5H-dibenzo[a,d]cycloheptene.

4. A compound according to claim 1, which is 8-methyl - 10 - (1 - dimethylaminoethyl)-5H-dibenzo[a,d]cycloheptene.

5. A compound according to claim 1, which is 8-methoxy - 10 - dimethylaminomethyl-5H-dibenzo[a,d]cycloheptene.

6. A compound according to claim 1, which is 8-chloro-10-dimethylaminomethyl-5H-dibenzo[a,d]-cycloheptene.

7. A compound according to claim 1, which is 5-methyl - 10 - dimethylaminomethyl - 5H-dibenzo[a,d]cycloheptene.

8. A compound according to claim 1, which is 8-methylthio - 10 - dimethylaminomethyl - 5H - dibenzo[a,d]cycloheptene.

9. A compound according to claim 1, which is 5,8-dimethyl - 10 - dimethylaminomethyl - 5H - dibenzo[a,d]cycloheptene.

10. A compound according to claim 1, which is 8-chloro - 10 - methylaminomethyl - 5H - dibenzo[a,d]cycloheptene.

References Cited

UNITED STATES PATENTS

| | | | |
|---|---|---|---|
| 3,389,177 | 6/1968 | Adank et al. | 260—570.8 |
| 3,480,624 | 11/1969 | Fouche | 260—570.9 X |
| 3,372,196 | 3/1968 | Engelhardt | 260—570.8 |
| 3,399,201 | 8/1968 | Schmidt et al. | 260—570.9 X |
| 3,422,104 | 1/1969 | Schroter et al. | 260—570.9 X |

OTHER REFERENCES

Burger, "Medicinal Chemistry," 2nd Ed., pp. 82–83 (1960).

Protiva et al., "Journal of Medicinal Chem.," vol. 4, No. 2, pp. 411–15 (1961).

ROBERT V. HINES, Primary Examiner

U.S. Cl. X.R.

260—570.9, 590, 609 R F, 611 F A, 612 R, 618 F H, 649 R, 668 F; 424—244, 250, 262, 267, 274, 330